US006857666B1

(12) United States Patent
Ashlock

(10) Patent No.: US 6,857,666 B1
(45) Date of Patent: Feb. 22, 2005

(54) SPRING AND APPARATUS FOR ITS USE

(76) Inventor: Jerry L. Ashlock, 109 Johnson, Copan, OK (US) 74022

( * ) Notice: Subject to any disclaimer, the term of this patent is extended or adjusted under 35 U.S.C. 154(b) by 236 days.

(21) Appl. No.: 10/198,402

(22) Filed: Jul. 18, 2002

(51) Int. Cl.[7] ............................................. F16L 21/00
(52) U.S. Cl. ................. 285/146.1; 285/268; 285/147.2; 285/117; 267/179; 60/322
(58) Field of Search ................................. 285/268, 269, 285/224, 146.1, 146.2, 146.3, 147.2, 49, 117, 118; 267/166, 179; 60/322

(56) References Cited

U.S. PATENT DOCUMENTS

| | | | | |
|---|---|---|---|---|
| 96,945 A | * | 11/1869 | Morse ...................... 285/146.1 |
| 378,284 A | * | 2/1888 | Briscoe ...................... 285/117 |
| 474,845 A | * | 5/1892 | Mayell ...................... 267/179 |
| 1,228,429 A | | 6/1917 | Griffin ........................... 24/32 |
| 1,618,579 A | | 2/1927 | D'Arey ...................... 267/112 |
| 1,749,117 A | * | 3/1930 | Weichsel ...................... 267/166 |
| 1,857,764 A | | 5/1932 | Nygard ....................... 267/166 |
| 2,028,122 A | | 1/1936 | Floreth ......................... 267/73 |
| 2,057,130 A | * | 10/1936 | Bard .......................... 285/268 |
| 2,242,604 A | * | 5/1941 | Wells .......................... 285/268 |
| 2,368,775 A | | 2/1945 | Perret .......................... 74/581 |
| 2,630,316 A | * | 3/1953 | Foster ........................ 267/166 |
| 3,063,741 A | | 11/1962 | Bockerman ................. 285/283 |
| 3,257,852 A | | 6/1966 | Perkins ........................ 73/739 |
| 3,482,872 A | | 12/1969 | Chamberlain ............... 297/472 |
| 3,705,740 A | | 12/1972 | Shiomi et al. ............. 293/137 |
| 3,724,603 A | | 4/1973 | Shiomi et al. ............. 188/371 |
| 3,815,941 A | | 6/1974 | Snyder ........................ 285/283 |
| 3,964,736 A | | 6/1976 | Huhnen ...................... 267/166 |
| 4,358,136 A | | 11/1982 | Tsuge et al. ................ 280/806 |
| 4,549,332 A | * | 10/1985 | Pouliot ........................ 285/117 |
| 4,679,760 A | | 7/1987 | Dotzler et al. .............. 248/602 |
| 4,791,243 A | | 12/1988 | Ibanez et al. ............. 174/45 R |
| 4,856,822 A | * | 8/1989 | Parker ...................... 285/146.1 |
| 5,219,030 A | | 6/1993 | Mordick ...................... 177/128 |
| 5,328,209 A | * | 7/1994 | Cromwell ................... 285/223 |
| 5,695,421 A | | 12/1997 | Fukuda ........................ 474/82 |
| 6,098,970 A | * | 8/2000 | Lowe .......................... 267/179 |
| 6,109,599 A | | 8/2000 | Kringel ....................... 267/179 |
| 6,146,067 A | * | 11/2000 | Owens ........................ 409/179 |
| 6,189,650 B1 | | 2/2001 | Inuzuka et al. ............. 181/254 |

OTHER PUBLICATIONS

Beisswenger, Roy, "Exhausting Little Details for Your Rotay,". Ultraflight Magazine (Feb. 2002), pp. 22–24.

* cited by examiner

Primary Examiner—David Bochna
(74) Attorney, Agent, or Firm—William R. Sharp

(57) ABSTRACT

There is provided a spring comprised of a wire which includes an elastic, coiled central portion and opposing end portions formed as hooks. Each hook terminates in an end having a hole therethrough. The spring is useful with an exhaust system of the type having a pair of sections joined but not affixed to one another to thereby form a flexible joint. A loop is fixedly connected to each section adjacent to the joint. The opposing hooks of the spring are securely received by the loops, and a safety wire is received through the hole in the end of each hook and secured to the corresponding loop. In an aircraft having an exposed exhaust system, the safety wire prevents a broken spring or loop from impacting and damaging vital components of the aircraft, particularly a pusher propeller positioned to the rear of the exhaust system.

15 Claims, 3 Drawing Sheets

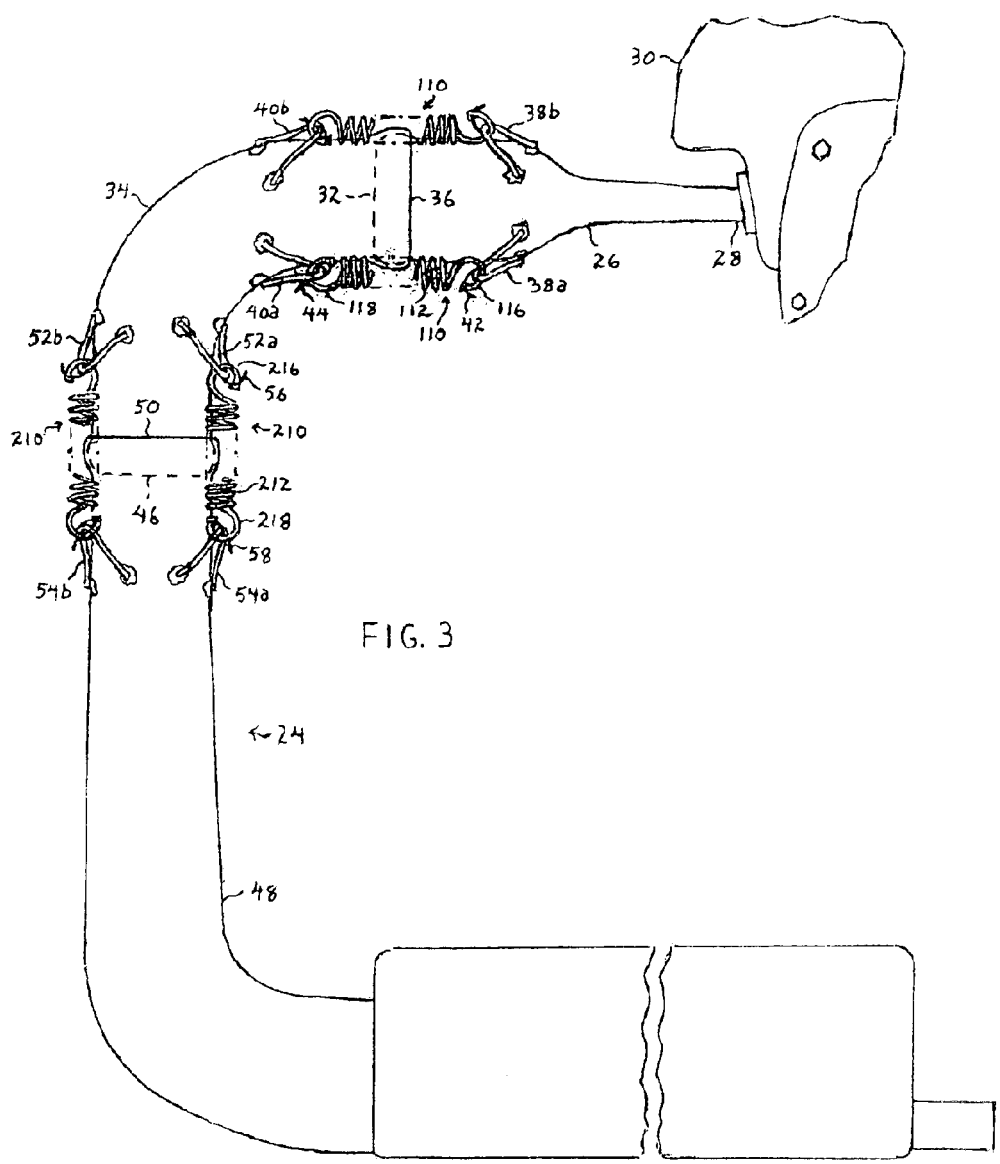
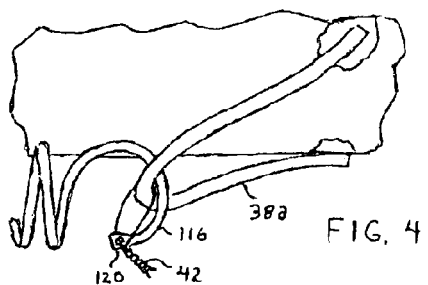
FIG. 3
FIG. 4

SPRING AND APPARATUS FOR ITS USE

BACKGROUND OF THE INVENTION

The invention relates to a spring and an apparatus for its use with an exhaust system.

An exhaust system can be very susceptible to vibration from an engine, such as in an ultralight aircraft. If the exhaust system is constructed as a unitary welded structure, the walls of the exhaust system are very susceptible to stress cracking. This problem is solved by constructing the exhaust system from at least two, and most preferably three, sections that are flexibly joined to one another. The sections are connected with ball joints that are held together with springs, thereby allowing relative movement between the joined sections. Adjoining sections have metal loops welded thereto for securely receiving opposing hooks of each spring.

In an ultralight aircraft having its engine and exhaust system uncovered and exposed, breakage of a spring or loop can result in damage to vital aircraft components. In an aircraft (i.e. powered parachute) with a pusher propeller positioned to the rear of the engine and exhaust system, a broken spring, or a broken loop and the spring, can fly into and damage the propeller. Aside from the cost of replacing the damaged propeller, a portion of a propeller blade could be lost in flight and result in severe vibration, which can then lead to damage to the remainder of the propeller as well as the engine or gear box. The pilot may then be forced to land the aircraft without the assistance of the engine driven propeller.

SUMMARY OF THE INVENTION

According to one aspect of the invention, there is provided a spring comprised of a wire which includes: an elastic, coiled central portion; and opposing end portions formed as hooks, each hook terminating in an end having a hole therethrough.

According to another aspect of the invention, an apparatus is provided which comprises: an exhaust system having first and second sections with respective ends that are joined but not affixed to one another to thereby form a flexible joint; a spring comprised of a wire, including (i) an elastic, coiled central portion having a length as in a relaxed state, and (ii) opposing end portions formed as first and second hooks, each hook terminating in an end having a hole therethrough; first and second hook retaining members (i.e. in the form of loops), the first hook retaining member being fixedly connected to the first section adjacent to the end thereof, and the second hook retaining member being fixedly connected to the second section adjacent to the end thereof, wherein the first hook is securely received by the first hook retaining member and the second hook is securely received by the second hook retaining member so that the coiled central portion of the spring is stretched beyond said length as in the relaxed state; and first and second safety wires, the first safety wire being received through the hole in the first hook and secured to the first hook retaining member, and the second safety wire being received through the hole in the second hook and secured to the second hook retaining member.

Therefore, the novel spring of the invention, having hook ends with holes therethrough, enables such ends to be secured with safety wire to respective hook retaining members formed as loops. As will be explained further below with respect to an aircraft having an uncovered and exposed exhaust system, the spring safety wired to loops in the manner described above effectively prevents any part of the spring (including the end of a hook) or loop from impacting and damaging a vital component (i.e. propeller) of the aircraft upon breakage of the spring or loop.

BRIEF DESCRIPTION OF THE DRAWINGS

FIG. 3 illustrates an apparatus which includes an exhaust system having three sections flexibly joined together, with springs secured between loops as fixedly connected to adjoining sections of the exhaust system.

FIG. 4 is a close-up view of the hook of a spring as secured with safety wire to a loop.

DETAILED DESCRIPTION OF THE INVENTION

Figure 1:
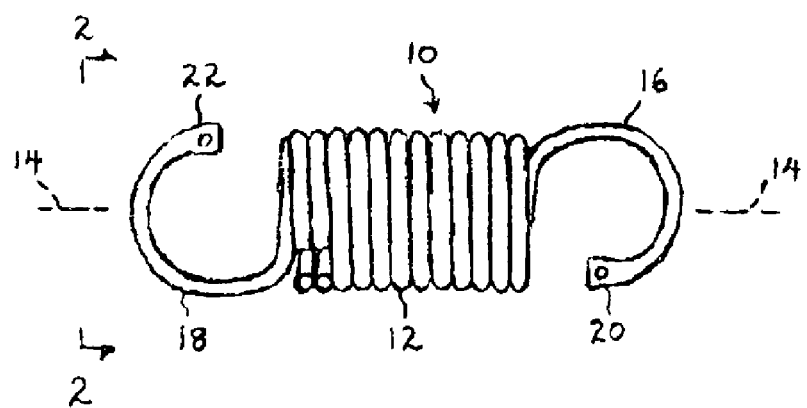
FIG. 1 is a side view of a spring in accordance with the invention.

Referring to FIG. 1, spring 10 is comprised of a wire (i.e. of a high carbon spring steel) which includes an elastic, coiled central portion 12 having a longitudinal axis 14. Coiled central portion 12 is preferably helically wound so as to have multiple and adjacent convolutions that contact one another when the coiled central portion is in its relaxed state as shown. Spring 10 further includes opposing end portions formed as hooks 16 and 18. Hook 16 terminates in an end 20 having a hole therethrough, and hook 18 similarly terminates in an end 22 also having a hole therethrough. Each of hooks 16 and 18 is curved so as terminate in its corresponding end adjacent to but longitudinally spaced from coiled central portion 12. As shown with respect to two convolutions of coiled central portion 12 that are partially broken away, the wire of spring 10 is preferably round in cross section, except for ends 20 and 22 which are flattened. Each flattened end and the remainder of the corresponding hook lie in a plane substantially parallel to axis 14. Hooks 16 and 18 are approximately coplanar, such that axis 14 lies in the plane of the hooks. Finally, and as shown, hooks 16 and 18 are preferably formed so that respective ends 20 and 22 are on opposite sides of axis 14.

Figure 2:
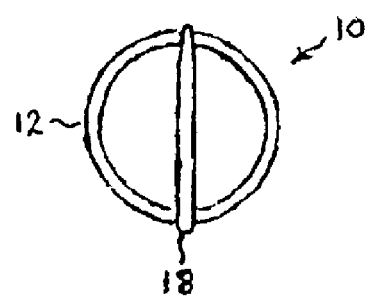
FIG. 2 is a view of the spring of FIG. 1 as viewed along line 2—2.

Referring to FIG. 2, this end view of spring 10 shows the preferred circular configuration of coiled central portion 12, and also clearly shows hook 18 as lying in a plane coincident with the axis of the coiled central portion. In the following description of FIG. 3, it should be understood that all referenced springs are identical in structure to spring 10 as shown and described with reference to FIGS. 1 and 2.

Referring to FIG. 3, the illustrated exhaust system 24 includes three sections of which the first section 26 comprises an exhaust manifold having an end 28 mounted to an engine 30 (of which only a portion is shown). Section 26 extends from engine 30 and end 28 to an opposing end 32 (indicated by broken lines). A second section 34 comprises a connecting elbow and has an end 36 that is joined with but not affixed to end 32 of section 26. AS shown, ends 32 and 36 are rounded so that end 32 fits snugly but movably within end 36 to form a first flexible ball joint. A loop 38a is fixedly connected by suitable welds to section 26 adjacent to end 32.

A loop 40a is similarly connected to section 34 adjacent to end 36. Hook 116 of spring 110 is securely received by loop 38a, and hook 118 is securely received by loop 40a so that coiled central portion 112 is stretched beyond the length thereof as in a relaxed state. A middle portion of spring 110 is broken away and indicated by phantom lines to clearly reveal the above-mentioned ball joint. A safety wire 42 is received through the hole in hook 116 and secured to loop 38a. Similarly, a safety wire 44 is received through the hole in hook 118 and secured to loop 40a. The safety wire is preferably comprised of stainless steel.

Referring to FIG. 4, this close-up view more clearly shows a simple manner in which safety wire secures the end of a hook to a loop. Loop 38a defines an opening through which safety wire 42 as well as hook 116 are received. AS shown, safety wire 42 is received around loop 38a and through the hole in end 120 of hook 116, with end portions of the safety wire being twisted together. Although not shown, the safety wire could be wrapped twice or more around the loop and additionally twisted immediately adjacent to the loop.

Referring back to FIG. 3, there is provided a second spring 110 secured to and between a pair of loops 38b and 40b by means of hooks and safety wires in the manner previously discussed. A third spring and a corresponding pair of loops and safety wires are also provided but not visible in FIG. 3. The three springs and corresponding loops and safety wires are circumferentially spaced around sections 26 and 34.

As shown, section 34 has an end 46 (indicated by broken lines) opposite end 36. A third section 48 of exhaust system 24 comprises a muffler (of which a portion is broken away) and has an end 50 that is joined with but not affixed to end 46 of section 34. Ends 46 and 50 are rounded so that end 46 fits snugly but movably within end 50 to form a second flexible ball joint. A loop 52a is fixedly connected by suitable welds to section 34 adjacent to end 46. A loop 54a is similarly connected to section 48 adjacent to end 50. Hook 216 of spring 210 (of which a portion is broken away) is securely received by loop 52a, and hook 218 is securely received by loop 54a so as to stretch coiled central portion 212. A safety wire 56 is received through the hole in hook 216 and secured to loop 52a. Similarly, a safety wire 58 is received through the hole in hook 218 and secured to loop 54a. There is provided a second spring 210 secured to and between a pair of loops 52b and 54b by means of hooks and safety wires in the manner discussed above. A third spring and a corresponding pair of loops and safety wires are also provided but not visible in FIG. 3. The three springs and corresponding loops and safety wires are circumferentially spaced around sections 34 and 48.

Figure 5:
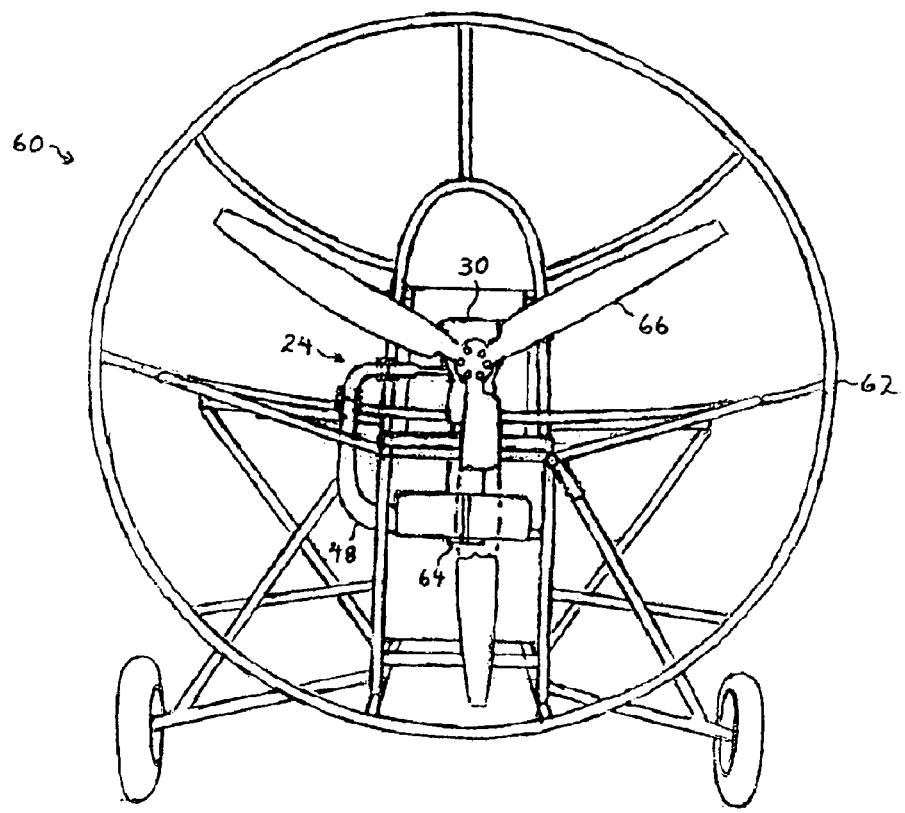
FIG. 5 is a rear view of a powered parachute having a frame and the apparatus of FIG. 3 mounted thereto, but without a parachute connected to the frame.

Referring to FIG. 5, this rear view of powered parachute 60 (without the parachute) shows a frame 62, comprised of multiple interconnecting bars, upon which engine 30 and exhaust system 24 are mounted. The muffler of section 48 is secured to frame 62 by means of a bracket 64 and associated metal strap. As shown, engine 30 and exhaust system 24 are uncovered and exposed. A propeller 66, as operably connected to engine 30, is positioned to the rear of and closely adjacent to the engine and exhaust system. Propeller 66 is a pusher propeller whose rotation acts to "push" and propel powered parachute 60 forwardly. A portion of one blade of propeller 66 is broken away and indicated by phantom lines to more clearly reveal the above-mentioned muffler and associated bracket.

Figure 6:
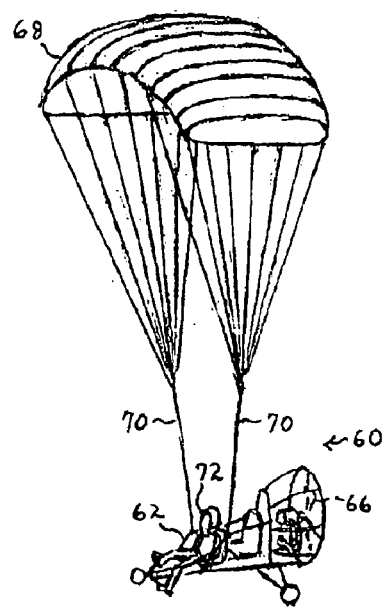
FIG. 6 illustrates the powered parachute of FIG. 5, with a parachute connected to the frame, as it appears in flight.

Referring to FIG. 6, parachute 68, as connected to opposite sides of frame 62 by cords 70, provides the necessary lift to support powered parachute 60 in flight as shown. The particular powered parachute illustrated in FIG. 6 is a two-seater, with the front seat occupied by a pilot 72. Rotating propeller 66 is represented by broken lines at the rear of frame 62.

Now considering the advantages of the invention with reference to spring 110 as secured to and between loops 38a and 40a in FIG. 3, employing safety wire to secure the ends of hooks 116 and 118 to loops 38a and 40a, respectively, effectively prevents any part of a broken spring or loop from flying into and damaging propeller 66 (FIG. 5). If, for example, hook 116 breaks adjacent to the end thereof, such end would remain safely secured to loop 38a with safety wire 42, and the remainder of the spring would remain safely secured to loop 40a with safety wire 44. More generally, if the spring breaks at any location, including central portion 112, this results in two separated parts of the broken spring, with one part remaining secured to loop 38a by means of safety wire 42 and the other part remaining secured to loop 40a with safety wire 44. Another possibility is breakage of either loop, such as at the welds to a section of the exhaust system. If, for example, loop 38a breaks off from section 26, loop 38a would remain secured to hook 116 with safety wire 42, and the entire spring with attached loop 38a would remain secured to loop 40a with safety wire 44.

Obviously, many modifications and variations of the present invention are possible in light of the above teachings. For example, the invention could be used in other aircraft having an uncovered and exposed exhaust system, such as a fixed wing aircraft. If the fixed wing aircraft had a pusher propeller to the rear of the engine and exhaust system, the invention would prevent damage to the propeller form a broken spring or loop in the manner discussed above. A fixed wing aircraft having a conventional pulling propeller in front of the engine and exhaust system would also benefit from the invention, since a broken spring or loop would be prevented from impacting and damaging the fabric of the wing or any tail fins. It is, therefore, to be understood that within the scope of the appended claims, the invention can be practiced otherwise than as specifically described.

That which is claimed is:

1. A spring comprised of a wire, including:
    an elastic, coiled central portion being helically wound and having a longitudinal axis; and
    opposing end portions formed as curved hooks, each hook terminating in an end having a hole therethrough and being adjacent to but longitudinally spaced from the coiled central portion;
    wherein the wire of the spring has substantially round cross section, except for the end of each hook which is flattened.

2. A spring as recited in claim 1 wherein the coiled central portion has multiple and adjacent convolutions that contact one another when the coiled central portion is in a relaxed state.

3. A spring as recited in claim 1 wherein each flattened end and the remainder of the corresponding hook lies in a plane substantially parallel to the longitudinal axis.

4. A spring as recited in claim 3 wherein the hooks are approximately coplanar, and wherein the longitudinal axis lies in the plane of the hooks.

5. An apparatus comprising:
    an exhaust system having first and second sections with respective ends that are joined but not affixed to one another to thereby form a flexible joint;
    a spring comprised of a wire, including (1) an elastic, coiled central portion having a length as in a relaxed state, and (ii) opposing end portions formed as first and second hooks, each hook terminating in an end having a hole therethrough;

first and second hook retaining members, the first hook retaining member being fixedly connected to the first section adjacent to the end thereof, and the second hook retaining member being fixedly connected to the second section adjacent to the end thereof, wherein the first hook is securely received by the first hook retaining member and the second hook is securely received by the second hook retaining member so that the coiled central portion of the spring is stretched beyond said length as in the relaxed state; and first and second safety wires, the first safety wire being received through the hole in the first hook and secured to the first hook retaining member, and the second safety wire being received through the hole in the second hook and secured to the second hook retaining member.

6. An apparatus as recited in claim 5 wherein the coiled central portion of the spring is helically wound.

7. An apparatus as recited in claim 6 wherein the coiled central portion of the spring has a longitudinal axis, and wherein each of the first and second hooks is curved so as to terminate in its corresponding end adjacent to but longitudinally spaced from the coiled central portion.

8. An apparatus as recited in claim wherein the wire of the spring has a substantially round cross section, except for the end of each hook which is flattened.

9. An apparatus as recited in claim 8 wherein the first hook retaining member comprises a first loop that defines a first opening through which the first hook and first safety wire are received, and wherein the second hook retaining member comprises a second loop that defines a second opening through which the second hook and second safety wire are received.

10. An apparatus as recited in claim 5 wherein the aforementioned end of the second section, flexible joint, and spring are hereafter denoted as the first end, first flexible joint, and first spring, respectively, and wherein the second section has an opposing second end, the apparatus further comprising: a third section of the exhaust system having an end joined with but not affixed to the second end of the second section to form a second flexible joint; a second spring with opposing third and fourth hooks terminating in ends having respective holes therethrough; a third hook retaining member for securely receiving the third hook and being fixedly connected to the second section adjacent to its second end: a fourth hook retaining member for securely receiving the fourth hook and being fixedly connected to the third section adjacent to the end thereof; a third safety wire received through the hole in the third hook and secured to the third hook retaining member; and a fourth safety wire received through the hole in the fourth hook and secured to the fourth hook retaining member.

11. An apparatus as recited in claim 10 wherein the apparatus includes a plurality of first springs and corresponding pairs of first and second hook retaining members and safety wires circumferentially spaced around the first and second sections of the exhaust system, and wherein the apparatus also includes a plurality of second springs and corresponding pairs of third and fourth hook retaining members and safety wires circumferentially spaced around the second and third sections of the exhaust system.

12. An apparatus as recited in claim 11 wherein the first section comprises an exhaust manifold, the second section comprises a connecting elbow, and the third section comprises a muffler.

13. An apparatus as recited in claim 5 wherein the apparatus is in an aircraft having an engine and associated propeller operably connected thereto, and wherein the exhaust system is mounted to and extending from the engine, such engine and exhaust system being uncovered and exposed.

14. An apparatus as recited in claim 13 wherein the propeller is a pusher propeller, to the rear of the engine and exhaust system, for propelling the aircraft forwardly.

15. An apparatus as recited in claim 14 wherein the aircraft is a powered parachute having a frame, upon which the engine and exhaust system are mounted, and a parachute connected to the frame for providing the necessary lift to support the aircraft in flight.

* * * * *

UNITED STATES PATENT AND TRADEMARK OFFICE
CERTIFICATE OF CORRECTION

PATENT NO. : 6,857,666 B1
DATED : February 22, 2005
INVENTOR(S) : Jerry L. Ashlock It is certified that error appears in the above-identified patent and that said Letters Patent is hereby corrected as shown below:

Column 4,
Line 49, after "has" -- a -- should be inserted.

Column 5,
Line 27, after "claim" -- 7 -- should be inserted.

Signed and Sealed this

Twenty-fourth Day of May, 2005

JON W. DUDAS
*Director of the United States Patent and Trademark Office*